United States Patent
Chu et al.

(10) Patent No.: US 9,076,376 B2
(45) Date of Patent: Jul. 7, 2015

(54) SUBTRACTIVE COLOR BASED DISPLAY WHITE POINT CALIBRATION

(71) Applicant: APPLE INC., Cupertino, CA (US)

(72) Inventors: Chia-Ching Chu, San Jose, CA (US); Gabriel G. Marcu, San Jose, CA (US); Jiaying Wu, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 162 days.

(21) Appl. No.: 13/861,175

(22) Filed: Apr. 11, 2013

(65) Prior Publication Data

US 2014/0071177 A1 Mar. 13, 2014

Related U.S. Application Data

(60) Provisional application No. 61/699,782, filed on Sep. 11, 2012.

(51) Int. Cl.
| | |
|---|---|
| *G09G 5/02* | (2006.01) |
| *G09G 3/20* | (2006.01) |
| *G09G 3/36* | (2006.01) |
| *H04N 1/60* | (2006.01) |
| *H04N 5/45* | (2011.01) |
| *H04N 5/57* | (2006.01) |
| *H04N 9/64* | (2006.01) |
| *G06T 3/40* | (2006.01) |
| *G06T 11/00* | (2006.01) |
| *G06T 11/60* | (2006.01) |
| *G06T 15/40* | (2011.01) |

(52) U.S. Cl.
CPC .......... *G09G 3/2003* (2013.01); *H04N 1/6058* (2013.01); *G06T 3/4007* (2013.01); *G06T 11/001* (2013.01); *G09G 3/3648* (2013.01); *G09G 2310/0297* (2013.01); *G09G 2320/0666* (2013.01); *G09G 2340/06* (2013.01)

(58) Field of Classification Search
USPC ......... 345/581, 589–591, 606, 643–644, 426, 345/204, 690, 207, 694, 697; 348/177, 179, 348/180–181, 254, 268–269, 557, 560, 571, 348/577, 599, 602, 612, 630, 655, 687, 739, 348/756; 358/504, 509, 514, 516, 518–520, 358/525, 447–448; 382/162–163, 167, 254, 382/274, 276, 312; 359/237, 242; 370/536, 370/542
See application file for complete search history.

(56) References Cited

U.S. PATENT DOCUMENTS

| | | | | |
|---|---|---|---|---|
| 5,363,318 A | * | 11/1994 | McCauley | ............ 702/85 |
| 6,243,059 B1 | * | 6/2001 | Greene et al. | ............ 345/88 |
| 7,342,592 B2 | | 3/2008 | Feng | |
| 7,728,845 B2 | | 6/2010 | Holub | |

(Continued)

Primary Examiner — Wesner Sajous
(74) Attorney, Agent, or Firm — Fletcher Yoder PC

(57) ABSTRACT

Systems, methods, and devices for white point calibration using subtractive color measurements are provided. Specifically, a white point of a display may be calibrated using subtractive color measurements rather than merely additive color measurements. In one example, a display having red, green, and blue pixels may measure the responses in a subtractive color space (e.g., CMY) rather than additive color space (e.g., RGB). Measurements of the display response using subtractive color space may involve providing image data to two or more color channels at once. Thus, any crosstalk effect between channels may be accounted for, even though the same crosstalk effect might not be apparent using additive color measurements in which only a single channel color channel were measured.

18 Claims, 12 Drawing Sheets

(56) References Cited

U.S. PATENT DOCUMENTS

| | | | |
|---|---|---|---|
| 2006/0280360 A1* | 12/2006 | Holub | 382/162 |
| 2009/0122517 A1* | 5/2009 | Park | 362/97.1 |
| 2009/0201309 A1* | 8/2009 | Demos | 345/589 |
| 2011/0007088 A1 | 1/2011 | Park et al. | |
| 2011/0205498 A1 | 8/2011 | Brown et al. | |
| 2011/0227487 A1* | 9/2011 | Nichol et al. | 315/158 |
| 2012/0056910 A1 | 3/2012 | Safaee-Rad et al. | |

* cited by examiner

SUBTRACTIVE COLOR BASED DISPLAY WHITE POINT CALIBRATION

CROSS-REFERENCE TO RELATED APPLICATIONS

This application claims the benefit of U.S. Provisional Application No. 61/699,782, "Subtractive Color Based Display White Point Calibration," filed 11 Sep. 2012, which is incorporated by reference herein in its entirety.

BACKGROUND

This disclosure relates generally to white point calibration for an electronic display and, more particularly, to white point calibration using subtractive color measurements.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays appear in many electronic devices. One type of electronic display, known as a liquid crystal display (LCD), modulates light passing through pixels of various colors using a liquid crystal material to generate images. An LCD may include a number of mass-produced components with characteristics that can vary from display to display. To provide a few examples, a backlight unit of the LCD may have light emitting diodes (LEDs) that emit light of different wavelengths and may have variable phosphor concentration; or a cell gap of the display panel and/or a color filter thickness may vary slightly. Such variations may cause a white point—the color emitted when the display is programmed to the color white—to vary slightly from LCD to LCD.

To account for these variations, LCDs may be calibrated to produce a white point within a desired color range. Such white point calibration may rely on the color additivity properties of red, green, and blue pixel channels of the LCDs. The assumption of linearity may not hold, however, for all types of LCDs. Indeed, when an LCD exhibits a crosstalk phenomenon, the color additivity of red, green, and blue channels may not hold. As a result, the white point calibration may not reliably produce properly calibrated displays. Moreover, techniques relating to accounting for crosstalk may involve complex or inefficient calculations or color channel characterizations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of this disclosure relate to systems, methods, and devices for white point calibration using subtractive color measurements. Specifically, since additive color measurements may not account for crosstalk that may occur in some displays, a white point of a display instead may be calibrated using subtractive color measurements. For example, a display having red, green, and blue pixels may measure the responses in a subtractive color space (e.g., CMY) rather than additive color space (e.g., RGB). Measurements of the display response using subtractive color space may involve providing image data to two or more color channels at once. Thus, any crosstalk effect between channels may be accounted for, even though the same crosstalk effect might not be apparent using additive color measurements in which only a single channel color channel were measured. In an example involving a display with red, green, and blue pixels, the subtractive color space measurements may be cyan (blue and green), magenta (blue and red), and yellow (red and green). The various systems, methods, and devices described herein may be used effectively to calibrate both electronic displays that exhibit a crosstalk phenomenon and electronic displays that do not exhibit a crosstalk phenomenon.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding additional embodiments that also incorporate the recited features.

As mentioned above, this disclosure relates to calibrating an electronic display for white point using subtractive color measurements rather than exclusively additive color measurements. As will be discussed below, using subtractive color measurements may permit white point calibration that may be accurate whether or not the display exhibits crosstalk behavior between color channels. Specifically, rather than calibrate the electronic display for white point using additive color measurements (e.g., separate red, blue, and green channel measurements), the display's white point may be calibrated based on subtractive color measurements (e.g., cyan (G+B), magenta (R+B), and yellow (R+G)). Measuring subtractive colors rather than additive colors may account for crosstalk occurring when one color channel interferes with another color channel. Based on such subtractive color measurements, any suitable white point calibration technique may be used to determine white point calibration parameters. The white point calibration parameters may represent, for example, values of a transformation matrix linking International Commission on Illumination (CIE) tristimulus values and RGB color space when the display includes red, green, and blue color channels.

Figure 1:
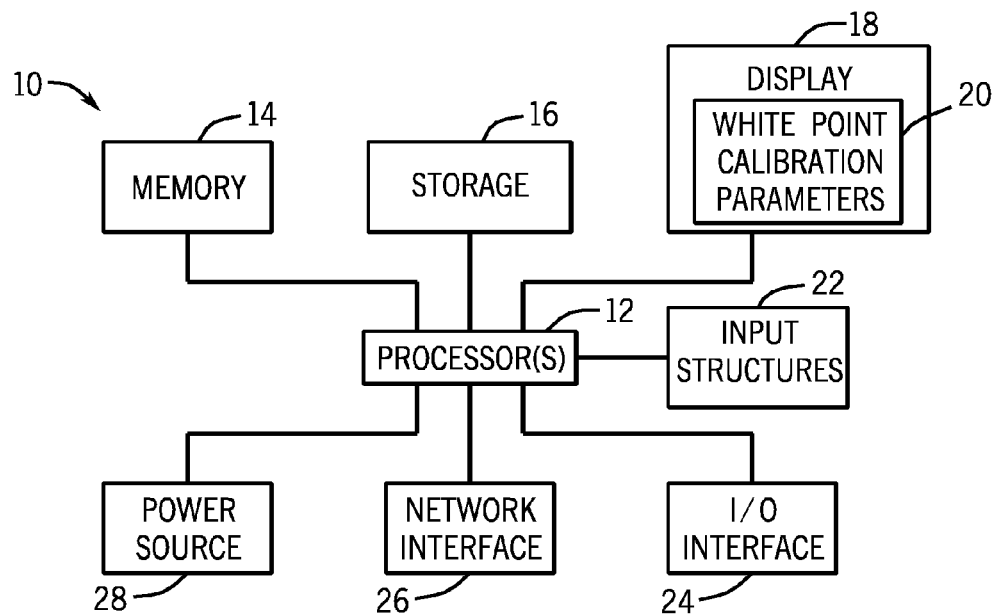
FIG. 1 is a block diagram of an electronic device having a display calibrated based on subtractive color measurements, in accordance with an embodiment.
Figure 2:
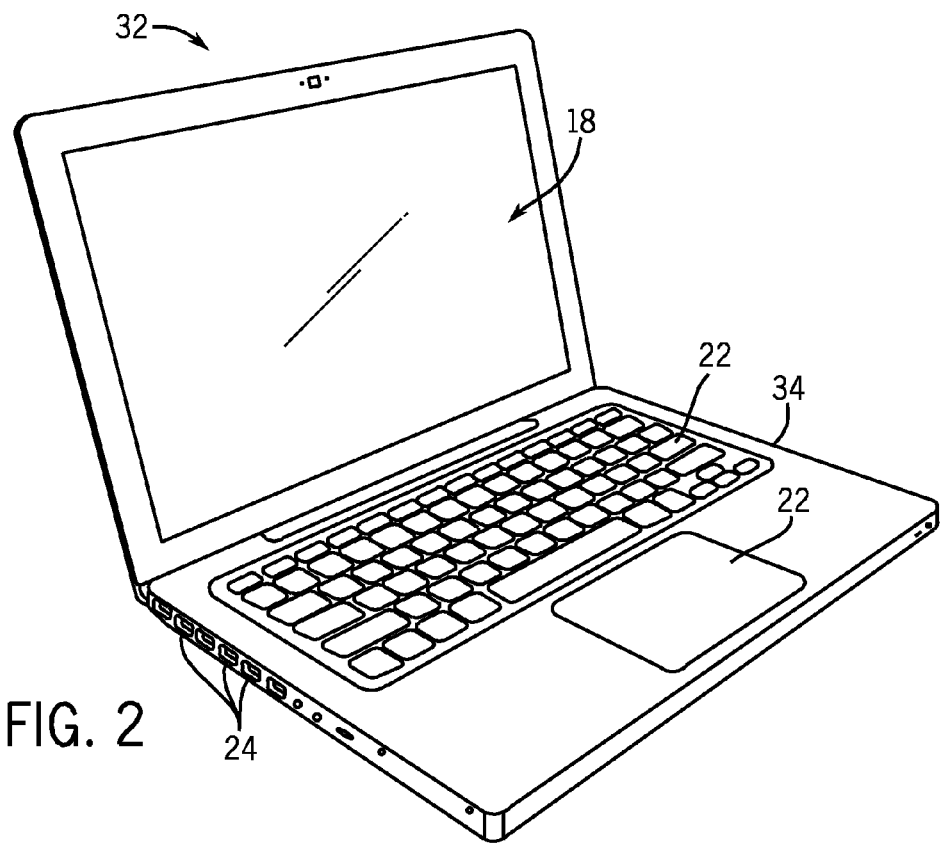
FIG. 2 is a perspective view of the electronic device of FIG. 1 in the form of a notebook computer, in accordance with an embodiment.
Figure 3:
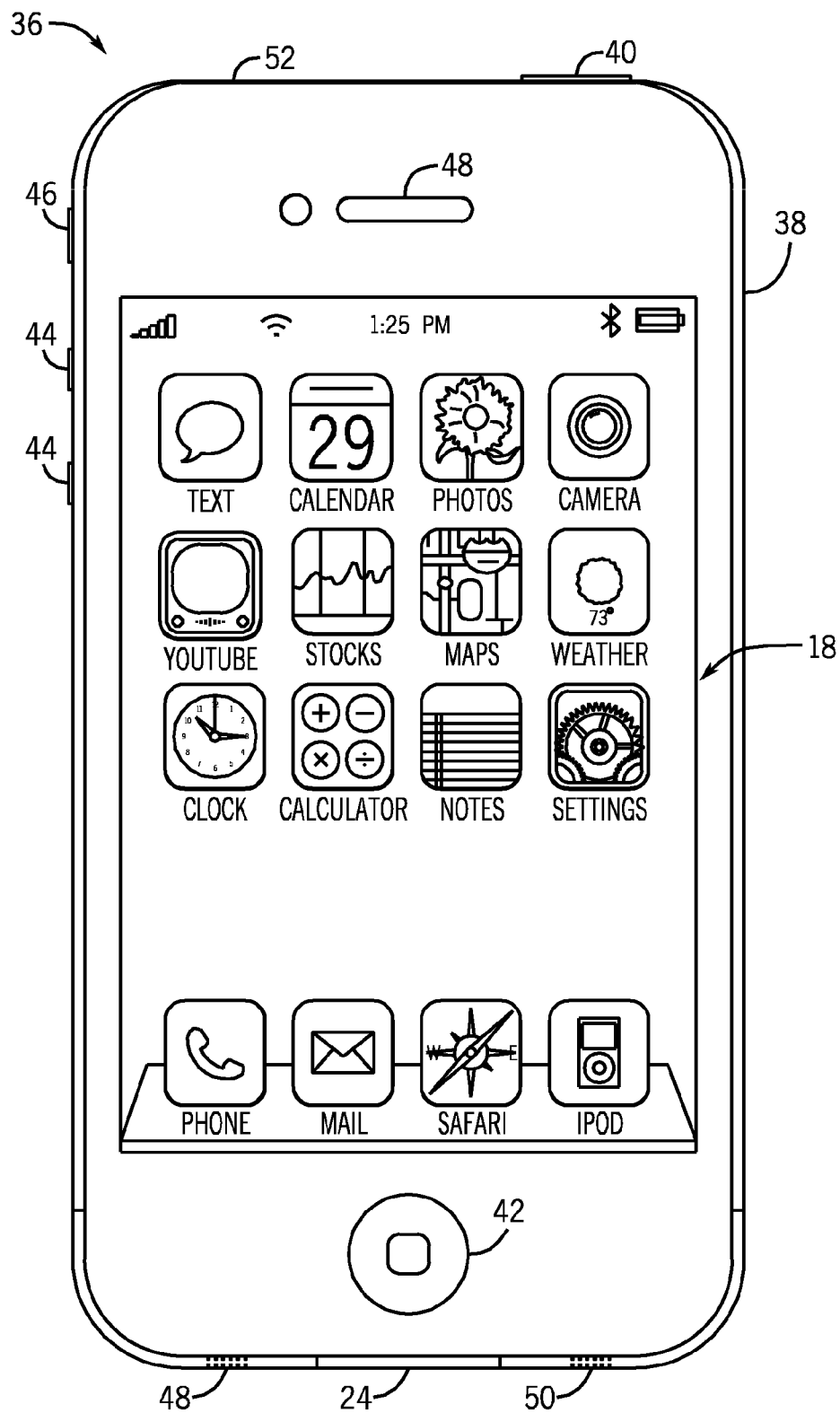
FIG. 3 is a front view of the electronic device of FIG. 1 in the form of a handheld device, in accordance with an embodiment.

With the foregoing in mind, many suitable electronic devices may employ electronic displays calibrated using subtractive color measurements. For example, FIG. 1 is a block diagram depicting various components that may be present in an electronic device suitable for use with such a display. FIGS. 2 and 3 respectively illustrate perspective and front views of suitable electronic devices. Specifically, FIGS. 2 and 3 illustrate a notebook computer and a handheld electronic device, respectively.

Turning first to FIG. 1, an electronic device 10 according to an embodiment of this disclosure may include, among other things, one or more processor(s) 12, memory 14, nonvolatile storage 16, a display 18 calibrated to have a white point according to white point calibration parameters 20, input structures 22, an input/output (I/O) interface 24, network interfaces 26, and/or a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10.

By way of example, the electronic device 10 may represent a block diagram of the notebook computer depicted in FIG. 2, the handheld device depicted in FIG. 3, or similar devices. In the electronic device 10 of FIG. 1, the processor(s) 12 and/or other data processing circuitry may be operably coupled with the memory 14 and the nonvolatile memory 16 to execute instructions. For instance, the processor(s) 12 may generate image data to be displayed on the display 18. The display 18 may be a touch-screen liquid crystal display (LCD). In some embodiments, the electronic display 18 may be a Multi-Touch™ display that can detect multiple touches at once. The display 18 may operate according to white point calibration parameters 20 programmed based on subtractive color measurements.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other suitable type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 32, is illustrated in FIG. 2 in accordance with one embodiment of this disclosure. The depicted computer 32 may include a housing 34, a display 18, input structures 22, and ports of an I/O interface 24. In one embodiment, the input structures 22 (such as a keyboard and/or touchpad) may be used to interact with the computer 32, such as to start, control, or operate a GUI or applications running on computer 32. The display 18 may have a white point controlled by the white point calibration parameters 20. The white point calibration parameters 20 may be determined using subtractive color measurements. As such, the white point calibration parameters 20 may cause the white point of the display 18 to more closely approach a target white point than were the calibration parameters 20 determined using exclusively additive color measurements.

FIG. 3 depicts a front view of a handheld device 36, which represents one embodiment of the electronic device 10. The handheld device 36 may represent, for example, a portable phone, a media player, a personal data organizer, a handheld game platform, or any combination of such devices. By way of example, the handheld device 36 may be a model of an iPod® or iPhone® available from Apple Inc. of Cupertino, Calif. In other embodiments, the handheld device 36 may be a tablet-sized embodiment of the electronic device 10, which may be, for example, a model of an iPad® available from Apple Inc.

The handheld device 36 may include an enclosure 38 to protect interior components from physical damage and to shield them from electromagnetic interference. The enclosure 38 may surround the display 18. The I/O interfaces 24 may open through the enclosure 38 and may include, for example, a proprietary I/O port from Apple Inc. to connect to external devices. User input structures 40, 42, 44, and 46, in combination with the display 18, may allow a user to control the handheld device 36. For example, the input structure 40 may activate or deactivate the handheld device 36, the input structure 42 may navigate a user interface to a home screen, a user-configurable application screen, and/or activate a voice-recognition feature of the handheld device 36, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones.

Figure 4:
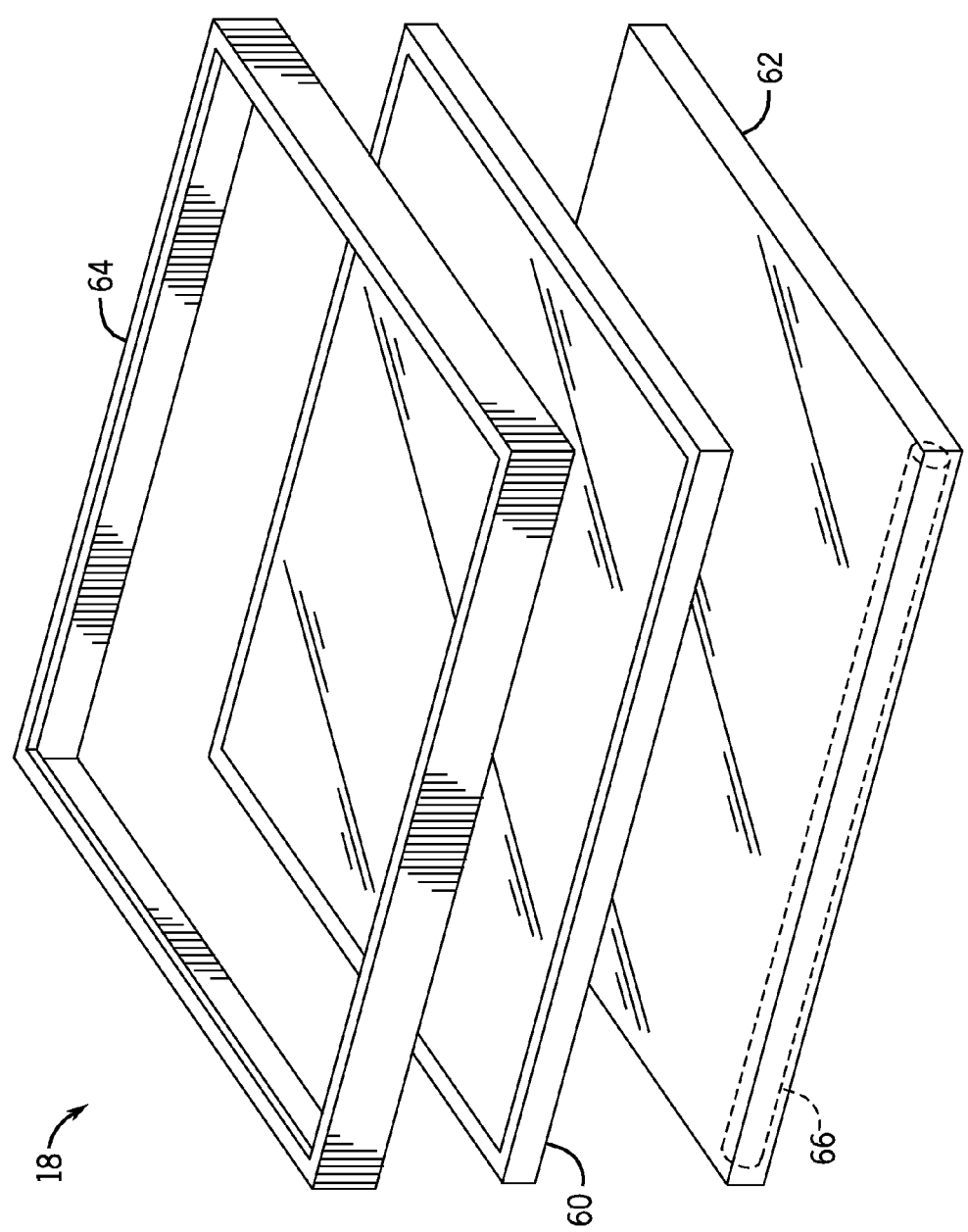
FIG. 4 is a perspective exploded view of components of the display, in accordance with an embodiment.
Figure 5:
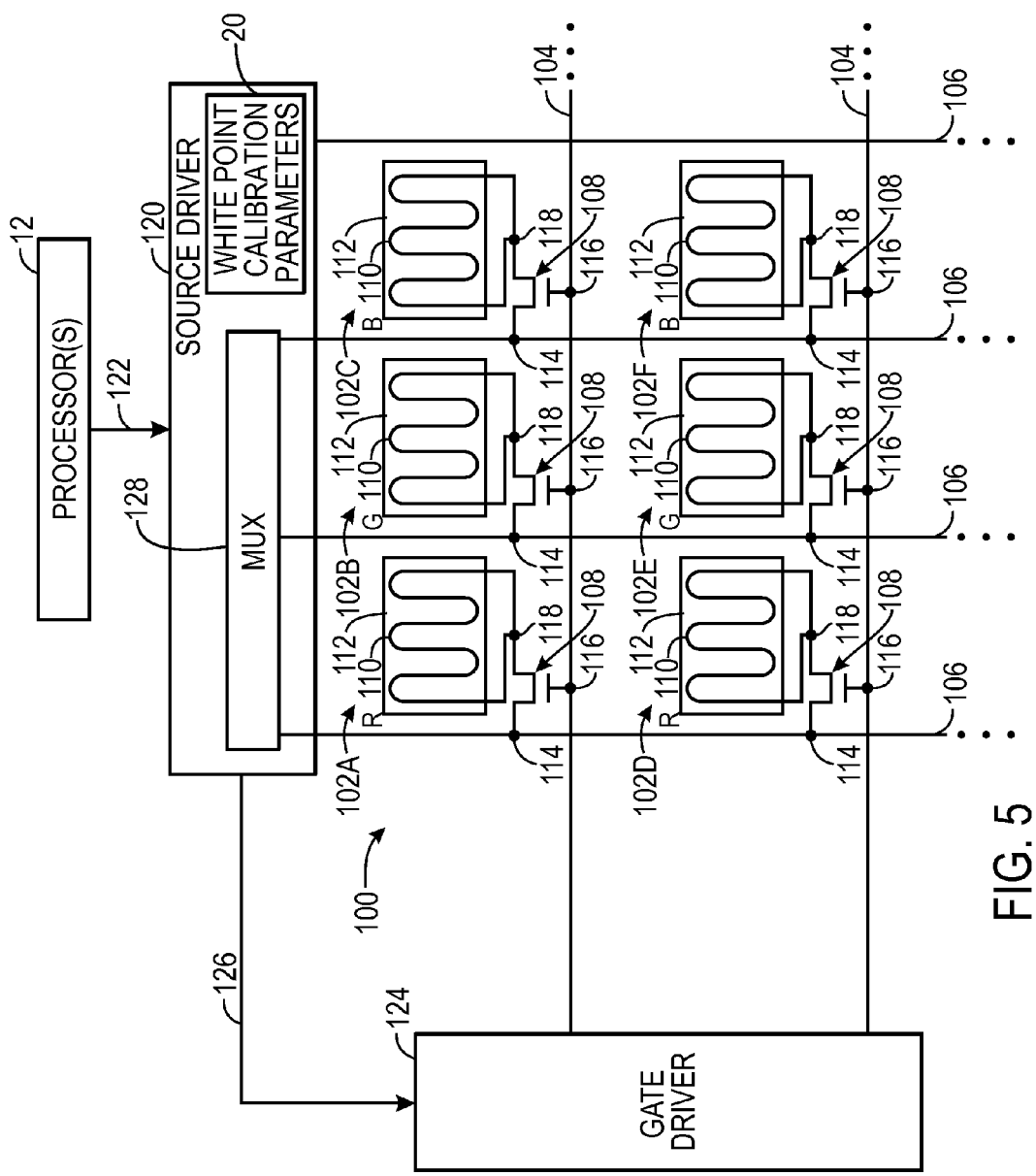
FIG. 5 is a circuit diagram of a pixel matrix of the display, in accordance with an embodiment.

One example of the display 18 of the electronic device 10 appears in exploded-view form in FIG. 4. The display 18 generally includes an LCD panel 60 and a backlight unit 62, which may be assembled within a frame 64. As may be appreciated, the LCD panel 60 may include numerous pixels that selectively modulate the amount and color of light passing from the backlight unit 62 through the LCD panel 60. The LCD panel 60 may employ any suitable liquid crystal display architecture, such as twisted nematic (TN), in-plane switching (IPS), fringe-field switching (FFS), and/or vertical alignment (e.g., multi-domain vertical alignment (MVA) or patterned vertical alignment (PVA)). The backlight unit 62 supplies the light that illuminates the LCD panel 60. This light derives from a light source 66, which is routed through portions of the backlight unit 62 before being emitted toward the LCD panel 60. The light source 66 may include a cold-cathode fluorescent lamp (CCFL), one or more light emitting diodes (LEDs), or any other suitable source of light.

The display 18 may operate by activating and programming a number of picture elements, or pixels. These pixels may be generally arranged in a pixel array 100 of the LCD panel 60, as shown in FIG. 4. The pixel array 100 of the display 18 may include a number of unit pixels 102 disposed in a pixel array or matrix. In such an array, each unit pixel 102 may be defined by an intersection of gate lines 104 (also referred to as scanning lines) and source lines 106 (also referred to as data lines). Although only six unit pixels 102 are shown (102A-102F), it should be understood that in an actual implementation, the pixel array 100 may include hundreds or thousands of such unit pixels 102. Each of the unit pixels 102 may represent one of three subpixels that respectively filter only one color (e.g., red, blue, or green) of light. For purposes of this disclosure, the terms "pixel," "subpixel," and "unit pixel" may be used largely interchangeably.

In the example of FIG. 4, each unit pixel 102 includes a thin film transistor (TFT) 108 for switching a data signal supplied to a respective pixel electrode 110. The potential stored on the pixel electrode 110 relative to a potential of a common electrode 112 may generate an electrical field sufficient to alter the arrangement of a liquid crystal layer of the display 18. When the arrangement of the liquid crystal layer changes, the amount of light passing through the pixel 102 also changes. A source 114 of each TFT 108 may connect to a source line 106 and a gate 116 of each TFT 108 may connect to a gate line 104. A drain 118 of each TFT 108 may be connect to a respective pixel electrode 110. Each TFT 108 may serve as a switching element that may be activated and deactivated by a scanning or activation signal on the gate lines 104.

When activated, a TFT 108 may pass the data signal from its source line 106 onto its pixel electrode 110. As noted above, the data signal stored by the pixel electrode 110 may be used to generate an electrical field between the respective pixel electrode 110 and a common electrode 112. This electrical field may align the liquid crystal molecules within the liquid crystal layer to modulate light transmission through the pixel 102. Thus, as the electrical field changes, the amount of light passing through the pixel 102 may increase or decrease. In general, light may pass through the unit pixel 102 at an intensity corresponding to the applied voltage from the source line 106.

These signals and other operating parameters of the display 18 may be controlled by integrated circuits (ICs) of the display 18. These driver ICs of the display 18 may include a processor, microcontroller, or application specific integrated circuit (ASIC). The driver ICs may be chip-on-glass (COG) components on a TFT glass substrate, components of a display flexible printed circuit (FPC), and/or components of a printed circuit board (PCB) that is connected to the TFT glass substrate via the display FPC. Further, the driver ICs of the display 18 may include the source driver 120 may include any suitable article of manufacture having one or more tangible, computer-readable media for storing instructions that may be executed by the driver ICs.

For instance, a source driver integrated circuit (IC) 120 may receive image data 122 from the processor(s) 12 and send corresponding image signals to the unit pixels 102 of the pixel array 100. The source driver 120 may also couple to a gate driver integrated circuit (IC) 124 that may activate or deactivate rows of unit pixels 102 via the gate lines 104. As such, the source driver 120 may provide timing signals 126 to the gate driver 124 to facilitate the activation/deactivation of individual rows (i.e., lines) of pixels 102. In other embodiments, timing information may be provided to the gate driver 124 in some other manner.

The source driver IC 120 may, in some examples, calibrate the image data 122 using the white point calibration parameters 20. The white point calibration parameters 20 may be stored (e.g., on a boot sector of read only memory (ROM) of the electronic device 10 or the display 18) and used to transform the image data 122 before or after the image data 122 is distributed by a multiplexer 128 to the source lines 106. In other examples, the white point calibration parameters 20 may be encoded into the display circuitry of the display 18 (e.g., voltage supply values and so forth). In still other examples, the white point calibration parameters 20 may be programmed onto other components of the electronic device 10 (e.g., the storage 16) and the processor(s) 12 may first adjust the image data 122 before it is provided to the display 18.

The white point calibration parameters 20 may be determined from any suitable image transformation parameters to adjust the image data 122 to account for individual differences from display 18 to display 18. In some examples, the white point calibration parameters 20 may be determined from a transformation matrix linking International Commission on Illumination (CIE) tristimulus values and RGB color space. Other similar transformation matrices may be employed when the display 18 includes additional or alternative color channels than red, green, and blue. One example of such a transformation matrix appears as Equation 1 below:

$$\begin{bmatrix} X \\ Y \\ Z \end{bmatrix} = \begin{bmatrix} X_r & X_g & X_b \\ Y_r & Y_g & Y_b \\ Z_r & Z_g & Z_b \end{bmatrix} \begin{bmatrix} R \\ G \\ B \end{bmatrix}. \qquad (1)$$

In Equation 1, the initial XYZ matrix represents color values in the CIE XYZ color space. The initial XYZ matrix is equal to a product of an XYZ transformation matrix and an RGB matrix, representing a color value in the RGB color space. Each of the coefficients of the XYZ transformation matrix ($X_r$, $X_g$, $X_b$, $Y_r$, $Y_g$, $Y_b$, $Z_r$, $Z_g$, and $Z_b$) relate the individual contribution of a particular color channel (subscripts r, g, or b) to a particular CIE XYZ color space component (X, Y, or Z). In effect, the nine coefficients of the transformation matrix appear to be composed by the measurement (X, Y, Z) of the full red, green, and blue channels for a particular display 18. When R=G=B=1, the X, Y, Z matrix on the left-hand side of the equation should equate to the sum of the tristimulus value of the full red, green, and blue channels, which represents white color. As mentioned above, however, such color modeling is based on an assumption that the display 18 has good color additivity. Not all displays 18 exhibit such color additivity. Thus, the coefficients of the XYZ transformation matrix may be determined not by additive color measurements, but rather may be determined based on subtractive color measurements, as will be discussed further below.

Figure 6:
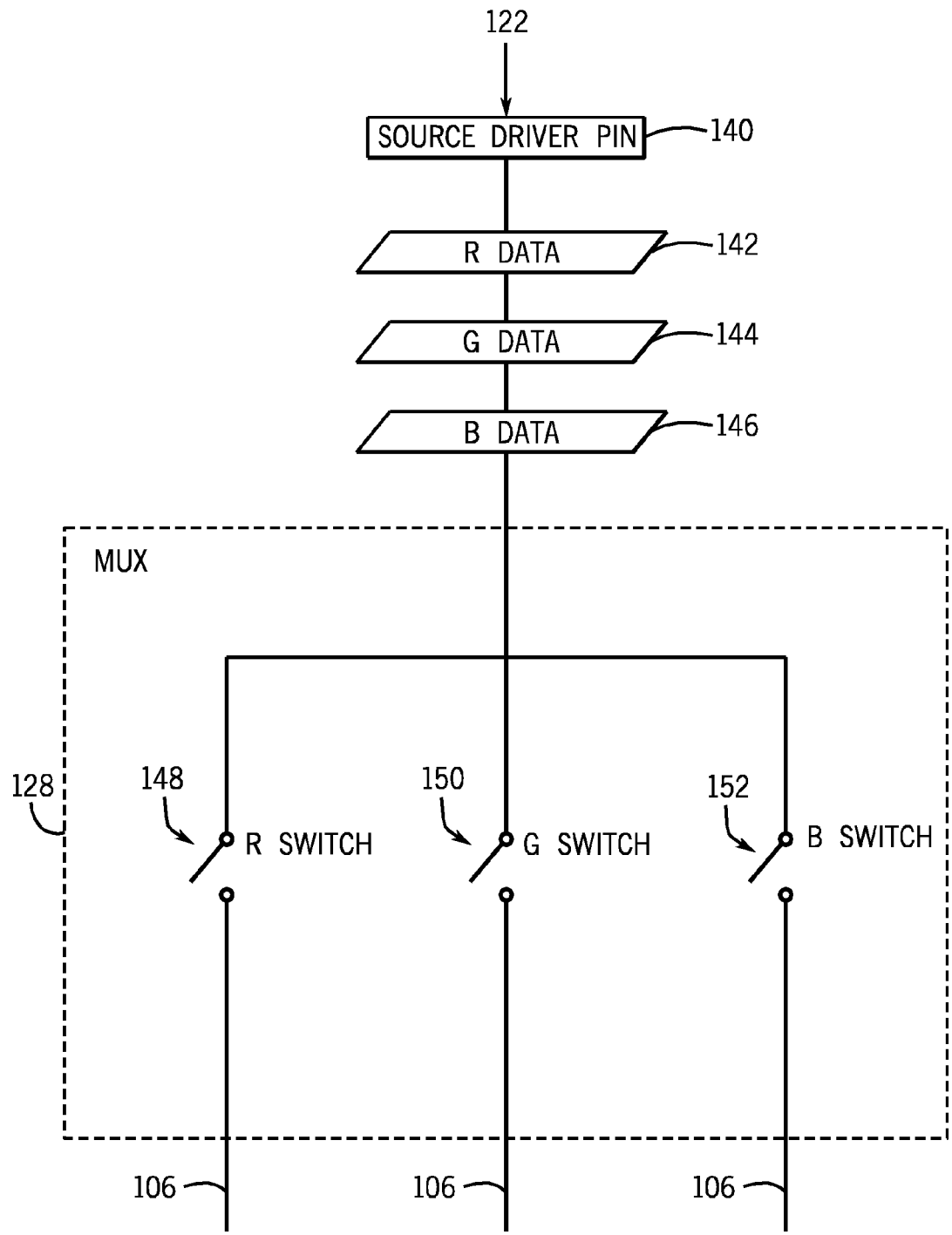
FIG. 6 is a block diagram of a component of driver circuitry of the display that could produce crosstalk between different color channels, in accordance with an embodiment.

The use of subtractive color measurements rather than additive color measurements may account for crosstalk that may occur between the various color channels. Indeed, when the multiplexer 128 of the source driver IC 120 is fabricated using certain materials (e.g., low temperature polysilicon, or LTPS), the multiplexer 128 may provide the image data 122 to red, green, and blue pixels 102 with slight but potentially noticeable crosstalk. As seen in FIG. 6, a source driver pin 140 may receive the image data 122 which may be, for example, red data 142, green data 144, and blue data 146. The multiplexer 128 may include switches 148, 150, and 152 that switch on and off to pass the image data 122 to a particular source line 106. In an amorphous silicon (a-Si) implementation, when a particular switch (e.g., 148) is closed, the remaining open switches (e.g., 150 and 152) will not permit any of the image data to pass to the respective source lines 106. When the multiplexer 128 is implemented in low temperature polysilicon (LTPS), however, some coupling may occur as the switches 148, 150, and 152 may not completely open and/or close.

Figure 7:
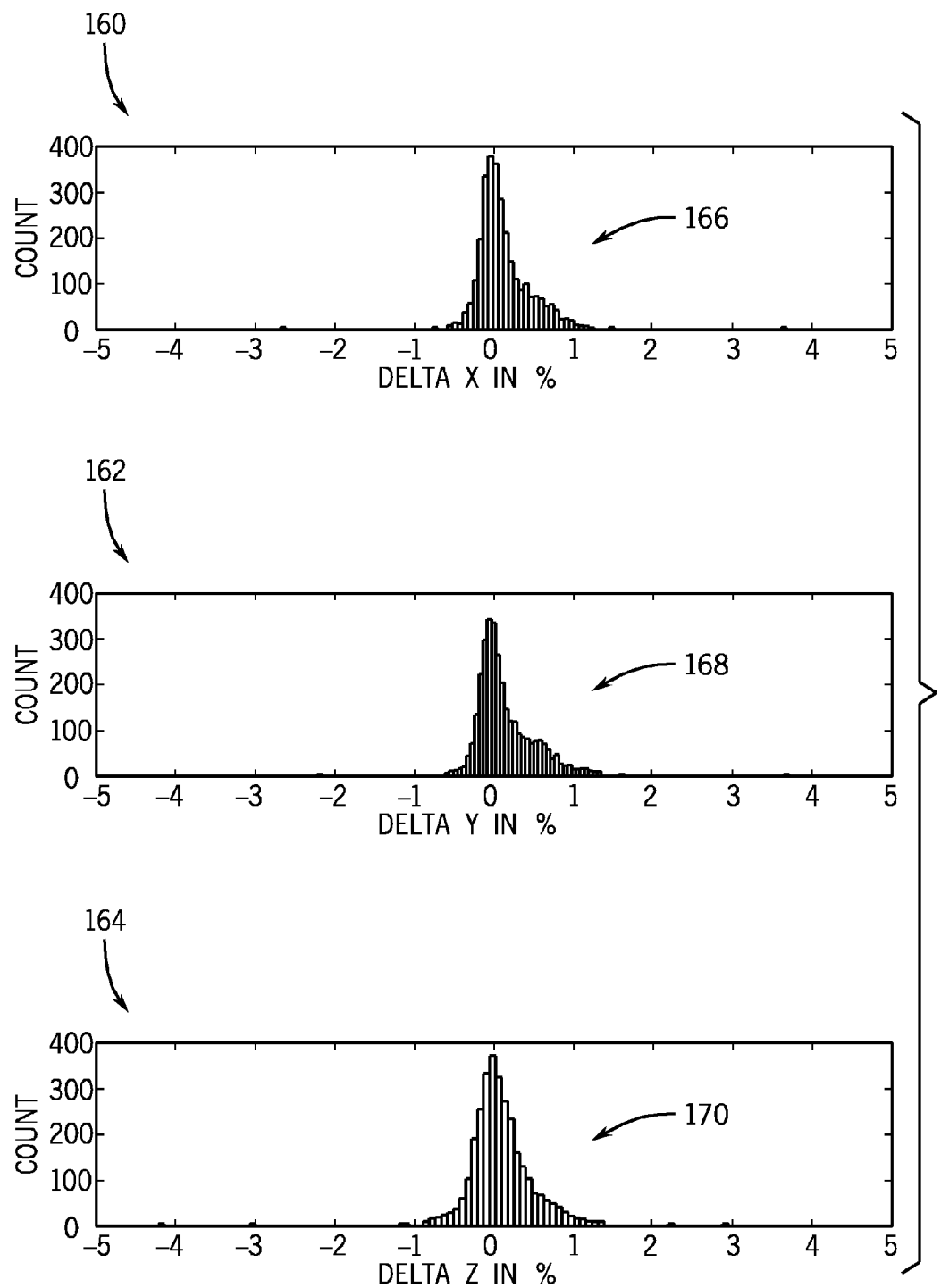
FIGS. 7 and 8 are histograms of the results of color additivity evaluations performed on display panels of amorphous silicon (a-Si) and display panels of low temperature polysilicon (LTPS), respectively, in accordance with embodiments.

This relationship appears when amorphous silicon (a-Si) displays 18 and low temperature polysilicon (LTPS) displays 18 were tested for color additivity errors in white point. Histograms of such errors appear in FIG. 7 (a-Si displays 18) and FIG. 8 (LTPS displays 18). First considering the color additivity errors in displays 18 of amorphous silicon (a-Si), three plots 160, 162, and 164 of FIG. 7 respectively represent histograms of color additivity errors in the X, Y, and Z tristimulus values for a number of a-Si displays 18. As can be seen in the histograms 160, 162, and 164, cumulative error totals 166 (X), 168 (Y), and 170 (Z) tend to center on an area of substantially zero error. Indeed, though some errors become apparent from each of the histograms, 160, 162, and 164, the error is generally mild and appears to extend not much farther than a maximum of 1%.

Figure 8:
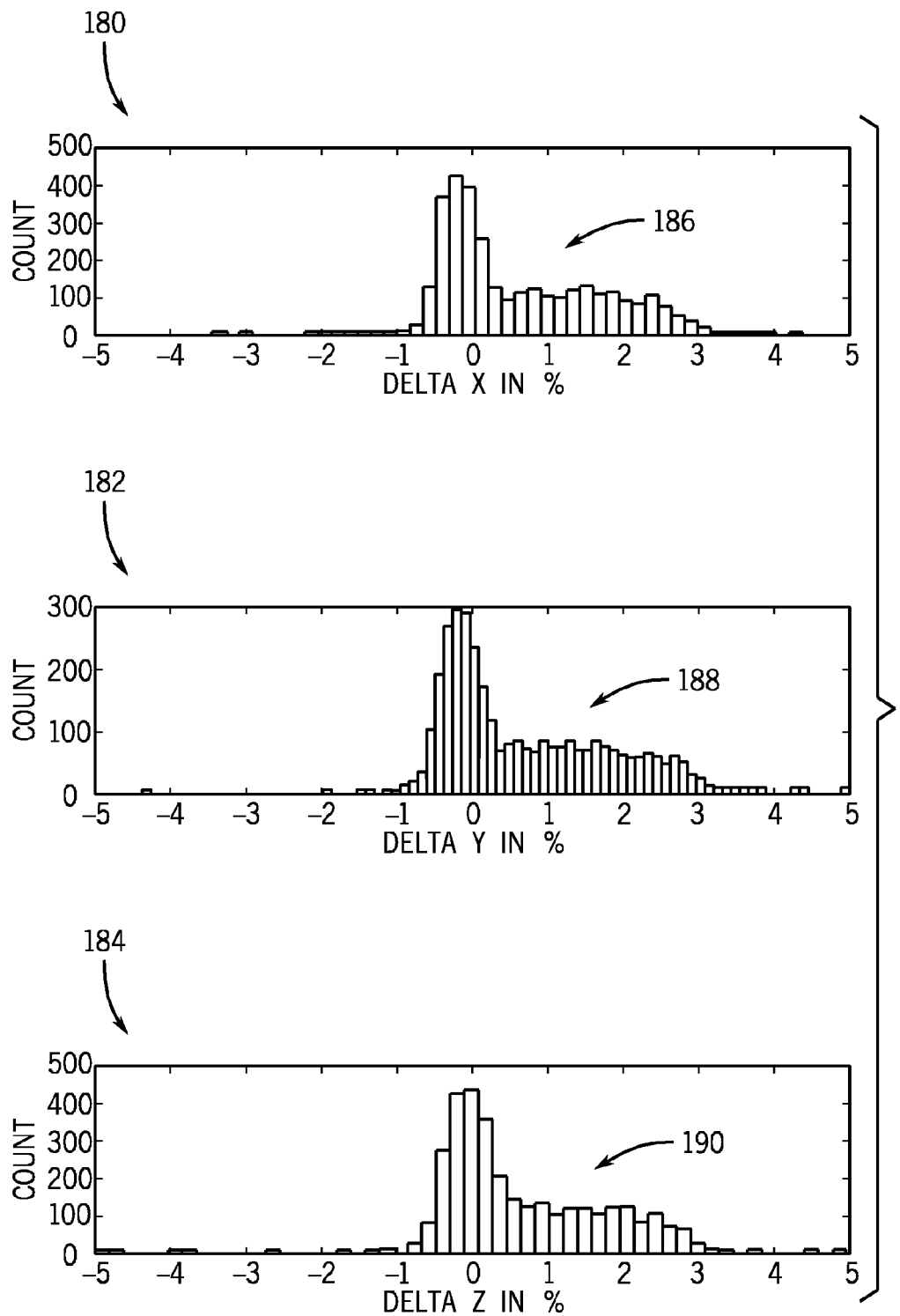

For displays 18 of low temperature polysilicon (LTPS), however, the presence of crosstalk may increase the amount of additive color error. In FIG. 8, histograms 180, 182, and 184 respectively represent histograms of color additivity errors in X, Y, and Z tristimulus values for a number of LTPS displays 18. In contrast to the histograms, 160, 162, and 164 of FIG. 7 that relate to a-Si displays 18, the histograms 180, 182, and 184 of FIG. 8 that relate to LTPS displays 18 show a marked increase in color error. Indeed, the cumulative totals 186 (X), 188 (Y), and 190 (Z) of appear to extend to as much as around 3% in the various X, Y, and Z components for some displays 18, which could significantly impact the accuracy of white point calibration.

A white point calibration based on subtractive color measurements, rather than exclusively additive color measurements, may account for some of these errors. Such subtractive color based white point calibration may compensate for crosstalk-induced color non-linearity. Moreover, the subtractive color based white point calibration of this disclosure may effectively calibrate displays 18 that may exhibit substantial crosstalk (e.g., LTPS displays 18) and those that may not (e.g., a-Si displays).

For a display 18 with red, green, and blue channels, white point calibration may take place using subtractive colors of cyan, magenta, and yellow. As mentioned above, in Equation 1 above, the nine coefficients of the transformation matrix are composed by the measurement (X, Y, Z) of the full red, green, and blue channels for a particular display 18. When R=G=B=1, the X, Y, Z matrix on the left-hand side of the equation should equate to the sum of the tristimulus value of the full red, green, and blue channels, which represents white color. As also mentioned above, however, such color modeling is based on an assumption that the display 18 has good color additivity. Not all displays 18 exhibit such color additivity. For example, an LTPS display 18 may have an inaccurate white point calibration when the coefficients of the XYZ transformation matrix are determined exclusively from additive color measurements.

Figure 9:
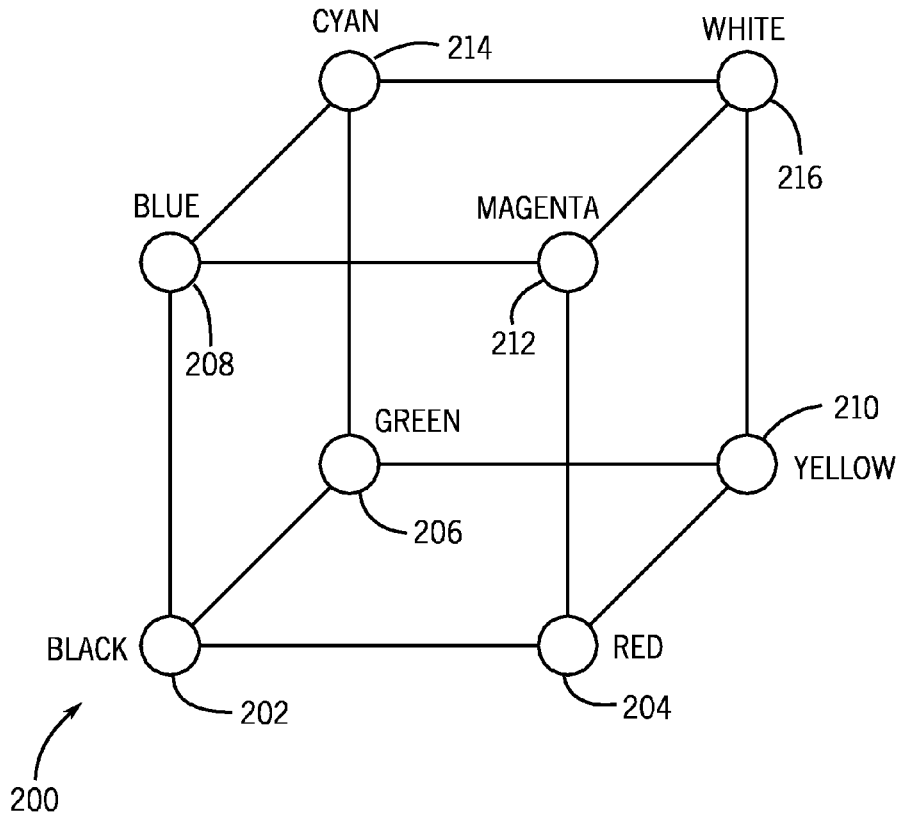
FIG. 9 is a diagram of a color cube showing a relationship between additive red, green, and blue (RGB) colors and subtractive cyan, magenta, and yellow (CMY) colors.

As such, subtractive colors of RGB (cyan, magenta, and yellow) may be used instead. These subtractive colors of the RGB color space are described in a color cube 200 shown in FIG. 9. In the color cube 200, the color black 202 represents an absence of light of any color. Extending from the color black 202 are three channels of colored light: red 204, green 206, and blue 208. Subtractive colors yellow 210, magenta 212, and cyan 214 may be formed by the combination of two of the three channels red 204, green 206, and blue 208. Specifically, yellow 210 may represent a combination of red 204 and green 206; magenta 212 may represent a combination of red 204 and blue 208; and cyan 214 may represent a combination of green 206 and blue 208. White 216 may represent the combination of red 204, green 206, and blue 208 or, accordingly, the combination of cyan 214, magenta 212, and yellow 210.

As will be noted below, the subtractive RGB colors cyan, magenta, and yellow may be measured and recomposed into a new 3×3 matrix made up of coupled red, green, and blue. The new XYZ transformation matrix, which may take the place of the XYZ transformation matrix of Equation 1, appears below relating various measurements of cyan, magenta, and yellow:

$$\begin{bmatrix} X_{r'} & X_{g'} & X_{b'} \\ Y_{r'} & Y_{g'} & Y_{b'} \\ Z_{r'} & Z_{g'} & Z_{b'} \end{bmatrix} = \begin{bmatrix} X_y + X_m - X_c & X_y - X_m + X_c & X_m - X_y + X_c \\ Y_y + Y_m - Y_c & Y_y - Y_m + Y_c & Y_m - Y_y + Y_c \\ Z_y + Z_m - Z_c & Z_y - Z_m + Z_c & Z_m - Z_y + Z_c \end{bmatrix}. \quad (2)$$

In Equation 2 above, the 3×3 XYZ transformation matrix on the left-hand side of the equation is made up of coupled red, green, and blue (thus, its coefficients include subscripts r', g', and b'). This 3×3 XYZ transformation matrix may take the place of the 3×3 XYZ transformation matrix shown in Equation 1. Because the 3×3 XYZ transformation matrix is made up of coupled color values, color activity may be re-established while taking into account the effect of crosstalk between the color channels. Namely, since subtractive color is, by definition, the combination of neighbor subpixels 102, measuring subtractive color already accounts for crosstalk components without any complex or inefficient calculations or characterizations. For example, a yellow color output by the display 18 may not be composed of pure red and green, but rather coupled red and green. Likewise, magenta output by the display 18 is composed of coupled red and blue, and cyan is composed of coupled blue and green.

Each subtractive color based coefficient ($X_{r'}$, $X_{g'}$, $X_{b'}$, $Y_{r'}$, $Y_{g'}$, $Y_{b'}$, $Z_{r'}$, $Z_{g'}$, $Z_{b'}$) of the 3×3 XYZ transformation matrix of Equation 2 may be determined from three subtractive color measurements, as apparent in Equation 2. Namely, to obtain the coefficients relating X, Y, and Z to respective RGB channels, a subtractive color measurement that does not include an RGB color channel of interest may be subtracted from the two other measurements that do include the RGB color channel of interest. For example, to obtain the coefficient relating the X color component and the red channel ($X_{r'}$), a value of the X color component from a measurement of cyan (B+G) may be subtracted from a sum of the measurements of yellow (R+G) and magenta (R+B), leaving only the value of the X color component relating to the red channel—though with the crosstalk effects of the other channels thereby included.

Figure 10:
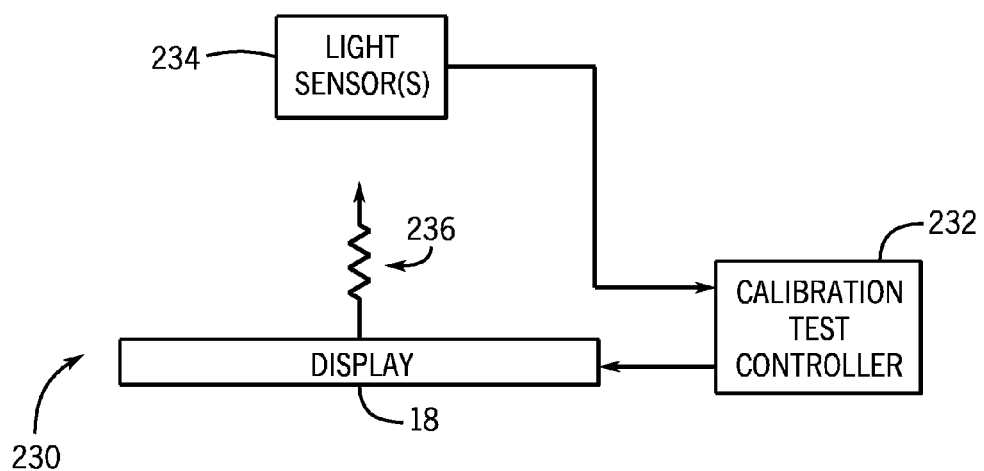
FIG. 10 is a block diagram of a white point calibration system, in accordance with an embodiment.

Using these subtractive color measurements, a calibration system 230 may calibrate a display 18, as shown in FIG. 10. A calibration test controller 232 may receive an indication of various responses from light sensor(s) 234, which may measure light 236 emitted by the display 18. The calibration test controller 232 may represent any suitable computing equipment that may perform a white point calibration based on subtractive color measurements. For instance, the calibration test controller 232 may carry out instructions stored on memory used by the calibration test controller 232. The instructions running on the test controller 232 may cause the display 18 to display certain test data to emit the light 236. The light sensor(s) 234 may represent any suitable light sensors (e.g., an imaging device such as a camera and/or photodiodes) that can perform measurements of subtractive colors. In some examples, the light sensor(s) 234 may specifically measure red, green, and blue light. In other examples, the light sensor(s) 234 may specifically measure cyan, magenta, and yellow light. In others, the light sensor(s) 234 may measure other colors of light and/or white light. The light sensor(s) 234 may, in some embodiments, include spectroscopic sensors.

The calibration test controller 232 may calibrate the white point of the display 18 using any suitable method. One such method may be the iterative approach described by U.S. patent application Ser. No. 13/477,680, "Method and Apparatus for Display Calibration," filed on May 22, 2012, which is assigned to Apple Inc. and incorporated by reference herein in its entirety. Regardless of the particular manner of determining the white point calibration parameters 20, the calibration test controller 232 generally may base the determination of white point calibration parameters 20 on subtractive color measurements rather than exclusively additive color measurements.

Figure 11:
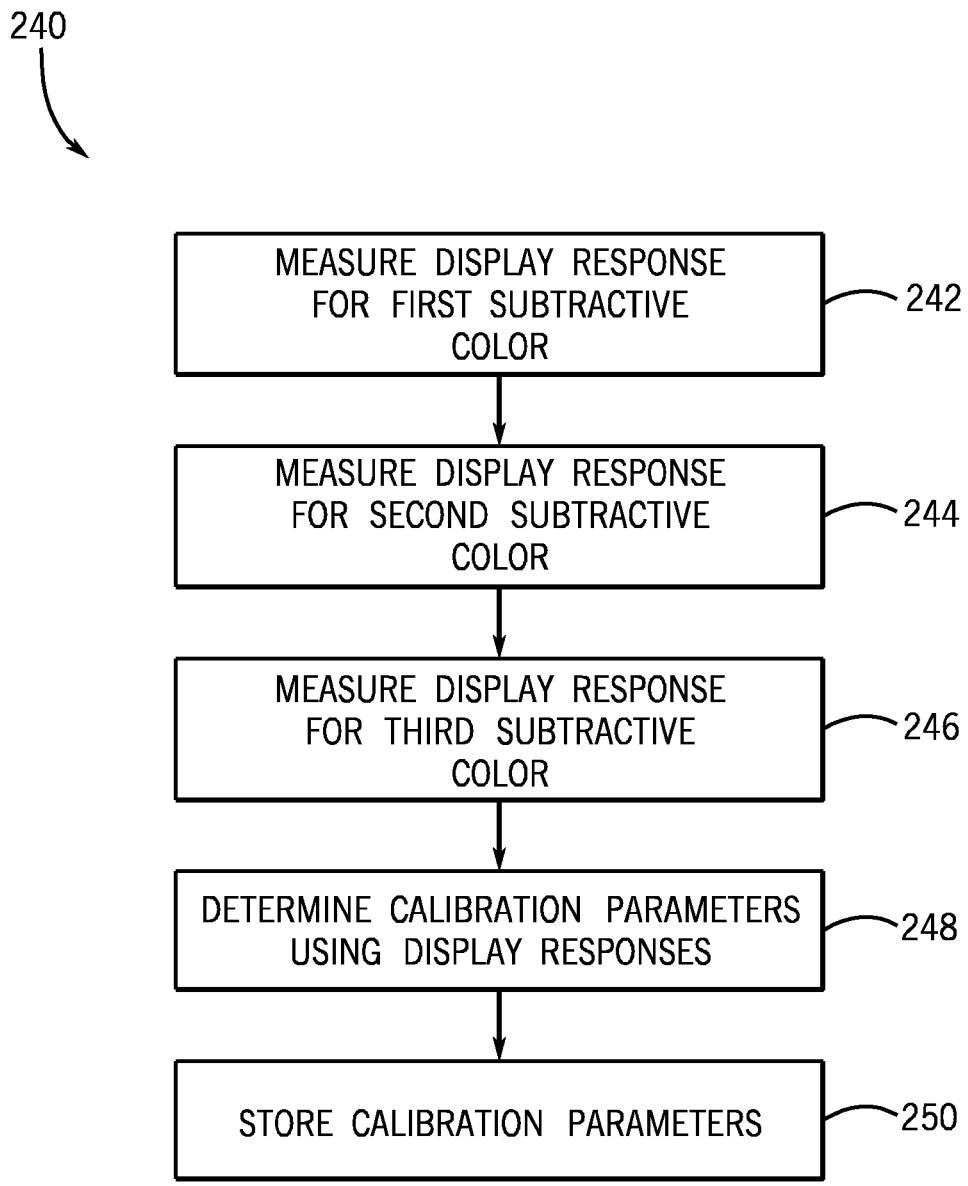
FIG. 11 is a flowchart of a method for calibrating the white point of the display using measurements of subtractive colors, in accordance with an embodiment.

Specifically, regardless of the number of times measurements are obtained, subtractive color measurements may be obtained for each subtractive color at least once, as shown by a flowchart 240 of FIG. 11. Namely, the calibration test controller 232 may cause the display 18 to emit light of a first subtractive color (e.g., cyan), measuring the response of the light sensor(s) 234 (block 242). The calibration test controller 232 may cause the display 18 to emit light of a second subtractive color (e.g., magenta), measuring the response of the light sensor(s) 234 (block 244). Finally, the calibration test controller 232 may cause the display 18 to emit light of a third subtractive color (e.g., yellow), measuring the response of the light sensor(s) 234 (block 246).

As described above in Equation 3, three subtractive color measurements may be used to obtain an XYZ transformation matrix for an RGB color space. From the relationships shown in Equations 1 and 2, the calibration test controller 232 may determine the white point calibration parameters 20 based on the subtractive color measurements of blocks 242, 244, and 246, (block 248). Indeed, the calibration test controller 232 may ascertain appropriate white point calibration parameters 20 for each color RGB channel using the relationships discussed above in relation to Equations 1 and 2. In essence, the calibration test controller 232 may select white point calibration parameters 20 that are expected, based on the subtractive color measurements of blocks 242, 244, and 246 and the relationships of Equations 1 and 2, to cause the display 18 to have a white point near to a target white point (e.g., within an acceptable range of white points). As such, the calibration test controller 232 may subtract subtractive color measurements that do not include an RGB color channel of interest from the two other measurements that do include the RGB color channel of interest to isolate the individual color channels (while still effectively measuring the effect of crosstalk with other color channels). For example, to obtain responses particularly associated with to the red color channel, a measurement of cyan (B+G) may be subtracted from a sum of the measurements of yellow (R+G) and magenta (R+B), leaving only the value relating to the red channel—though with the crosstalk components of the other channels thereby included. In determining the white point calibration parameters 20, the calibration test controller 232 may employ any suitable technique, including those that may involve additional measurements from the display 18. In most cases, however, at least the subtractive color measurements indicated at blocks 242, 244, and 246 may be performed to account for crosstalk that may occur when two or more channels are active.

When the calibration test controller 232 has determined the white point calibration parameters 20, the calibration test controller 232 may store the white point calibration parameters 20 into the display 18 (block 250). It should be appreciated that the flowchart 240 of FIG. 11 is intended to be illustrative and should not be taken as representing the only manner of calibrating the white point of the display 18. The purpose of the flowchart 240 of FIG. 11 is to convey that the display 18 may be calibrated based on subtractive color measurements (e.g., cyan, magenta, and yellow) rather than only additive measurements (e.g., red, green, and blue).

Figure 12:
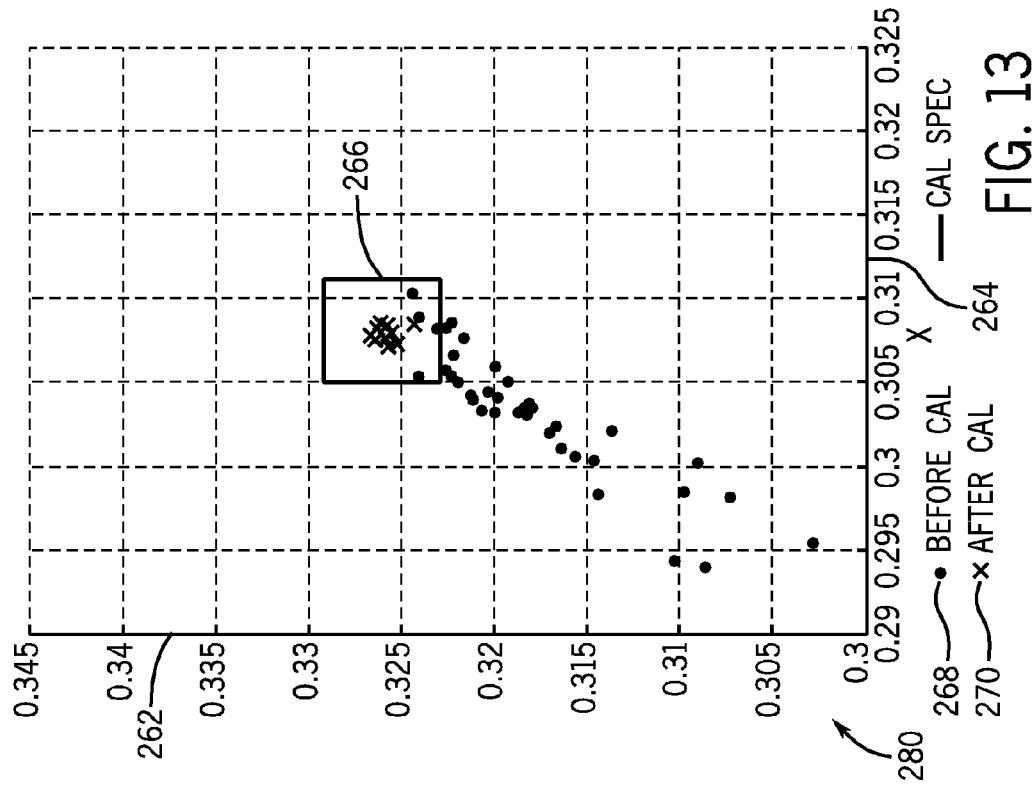
FIG. 12 is a plot of several electronic display white points before and after calibration using additive color measurements.
Figure 13:
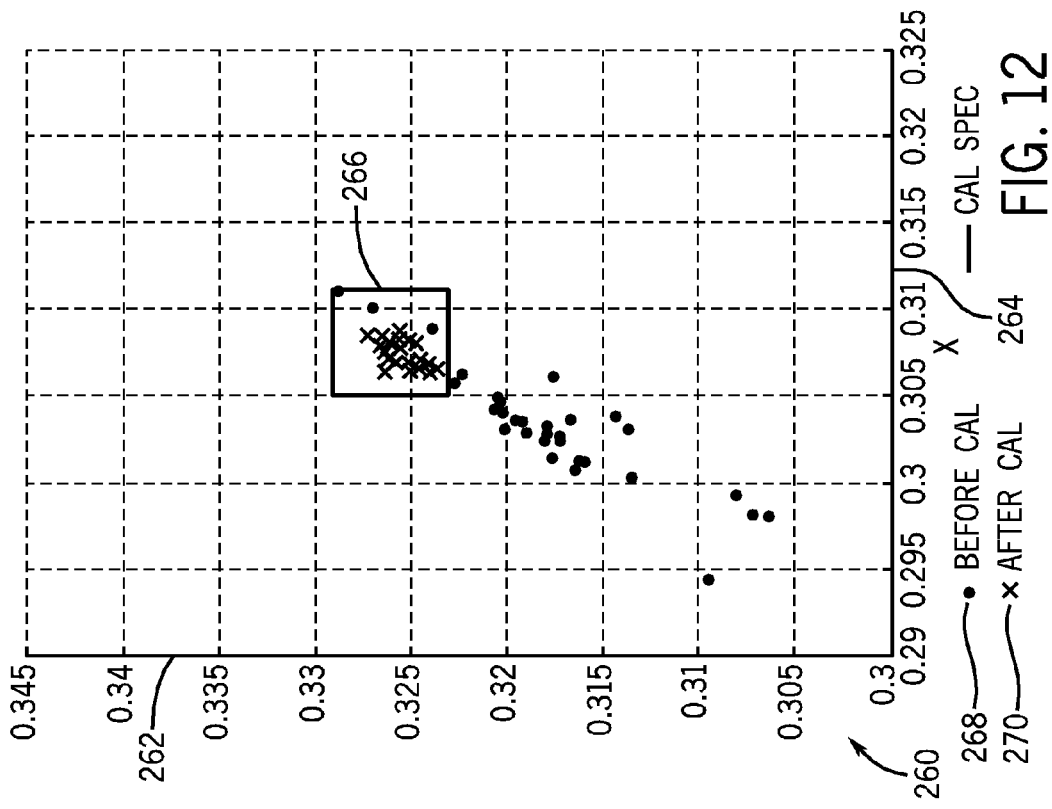
FIG. 13 is a plot of electronic display white points before and after calibration using subtractive color measurements, in accordance with an embodiment.

The impact of using subtractive rather than additive color to calibrate white point may be significant. The effects may be especially noticeable when used with displays 18 of low temperature polysilicon (LTPS), which may be prone to crosstalk between color channels. FIGS. 12 and 13 describe a comparison between performing white point calibration on a number of displays by measuring additive colors (FIG. 12) and measuring subtractive colors (FIG. 13). In a plot 260 shown in FIG. 12, an ordinate 262 represents Y component values of color and an abscissa 264 represents X component values of color in the CIE XYZ color space. A white point specification tolerance 266 represents a range of acceptable white points. The white points of displays 18 are represented by circles 268 before calibration and as x's 270 after calibration. As indicated by FIG. 12, before calibration, most of the displays 18 fall outside of the calibration white point specification range 266. After calibration using additive color measurements, most of the displays 18 are successfully calibrated to within the acceptable white point specification range 266, but not all. Moreover, while most of the displays 18 are shown to have been successfully calibrated to within the acceptable white point specification range 266, the white points of the displays 18 fall within a relatively wide range.

In comparison, as shown by a plot 280 of FIG. 13, when the displays 18 are calibrated using subtractive color measurements instead, the calibration may place the white points of the displays 18 more squarely within the white point specification range 266. In the plot 260 shown in FIG. 13, the ordinate 262 represents Y component values of color and the abscissa 264 represents X component values of color in the CIE XYZ color space. As indicated above, the white point specification tolerance 266 shown in FIG. 13 represents the range of acceptable white point colors, and the white points of displays 18 are represented by circles 268 before calibration and as x's 270 after calibration. In the example of FIG. 13, the displays 18 calibrated using subtractive color measurements have white points that are much more likely to remain within white point specification range 266. Moreover, the displays 18 are more likely to have white points that are much more close to the center of the white point specification range 266.

Figure 14:
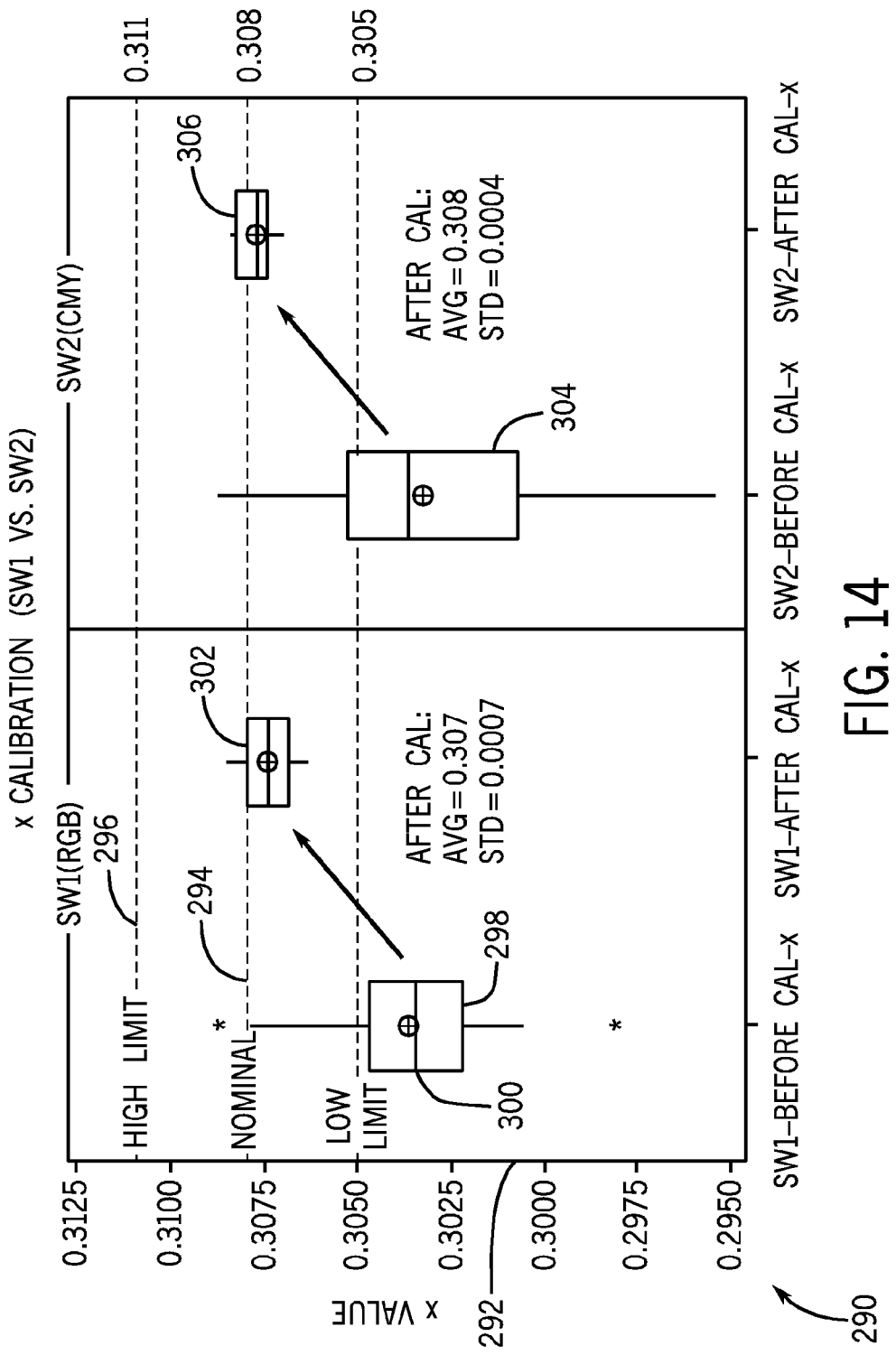
FIG. 14 is a comparative box plot of white point calibration using additive and subtractive color space measurements, respectively, measured in a Y direction of the color space, in accordance with an embodiment.
Figure 15:
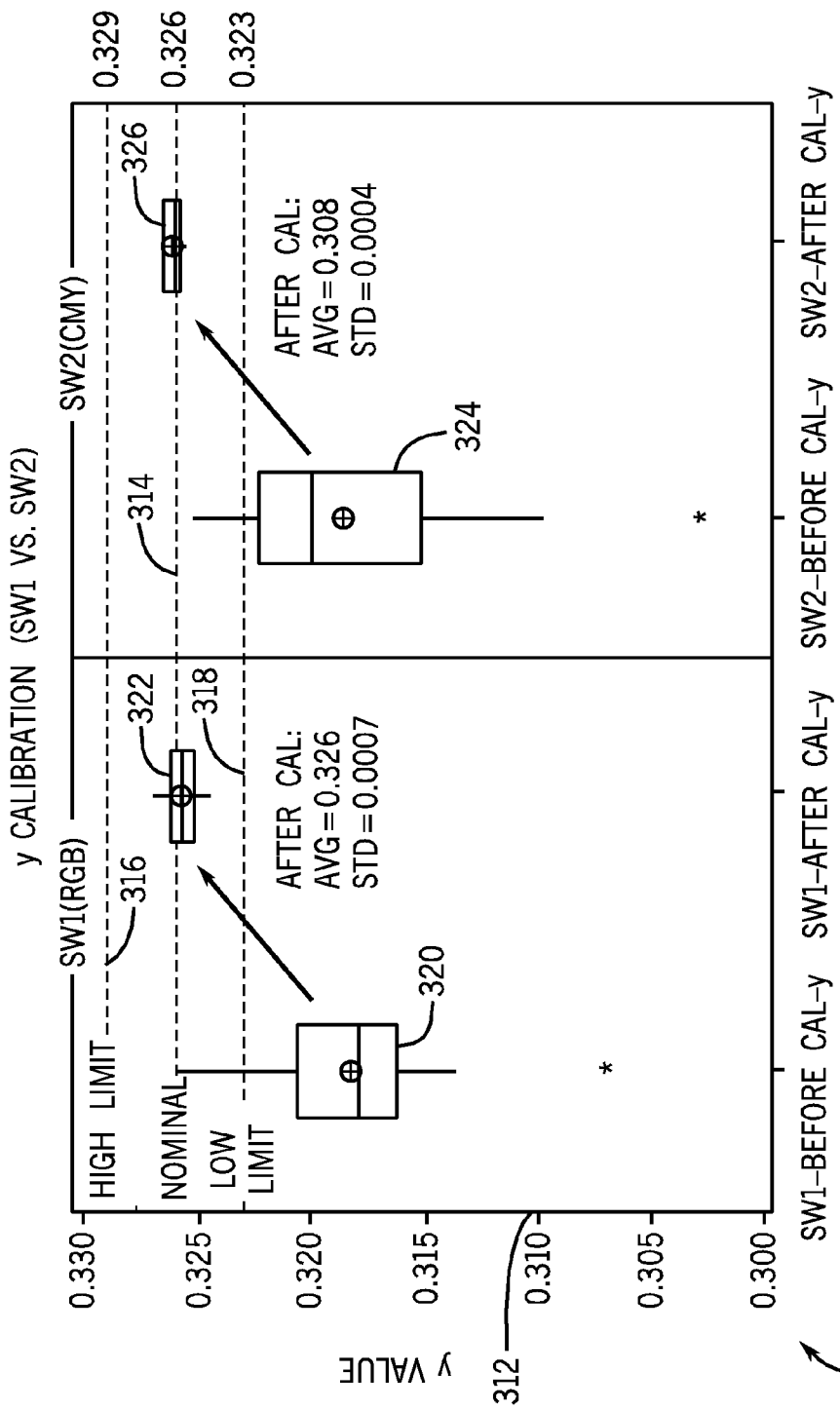
FIG. 15 is a comparative box plot of white point calibration using additive and subtractive color space measurements, respectively, measured in an X direction of the color space, in accordance with an embodiment.

FIGS. 14 and 15 similarly support calibrating white points using subtractive color measurements rather than exclusively additive color measurements. In FIG. 14, a comparative box plot 290 illustrates white point distributions for samples of displays 18 before and after calibration using either additive or subtractive color measurements. In the comparative box plot 290, an abscissa 292 represents a range of X components of the XYZ color space. A nominal target white point X value 294 (an X value of 0.308), a high limit of acceptable white point X values 296 (an X value of 0.311), and low limit of acceptable white point X values 298 (an X value of 0.305) are shown. A white point distribution 300 denotes a range of initial white point values for a sample of displays 18. After a white point calibration using additive color values, the same sample of displays 18 has a calibrated white point distribution 302. The calibrated white point distribution 302 is much closer to the nominal target white point X value 294 (0.308), having an average X value of 0.307 with a standard deviation of 0.0007.

Yet a white point calibration using subtractive color measurements yields even better results. In the comparative box plot 290, a white point distribution 304 denotes another range of initial white point values for a sample of displays 18. Despite this wider range of white points, after a white point calibration using subtractive color values, the same sample of displays 18 has a calibrated white point distribution 306. The calibrated white point distribution 306 is even closer to the nominal target white point X value 294 (0.308), having an average X value of 0.308 with a standard deviation of 0.0004.

Similarly, FIG. 14 illustrates a comparative box plot 310 showing white point distributions in the Y color component for samples of displays 18 before and after calibration using either additive or subtractive color measurements. In the comparative box plot 310, an abscissa 312 represents a range of Y components of the XYZ color space. A nominal target white point Y value 314 (a Y value of 0.326), a high limit of acceptable white point Y values 316 (a Y value of 0.329), and low limit of acceptable white point Y values 318 (a Y value of 0.323) are shown. A white point distribution 320 denotes a range of initial white point values for a first sample of displays 18. After a white point calibration using additive color values, the same sample of displays 18 has a calibrated white point distribution 322. The calibrated white point distribution 322 is closer to the nominal target white point Y value 314 (0.326), having an average Y value of 0.326 with a standard deviation of 0.0007. These results are similar to those shown in the plot 290 of FIG. 14.

Like the comparative box plot 290 of FIG. 14, the comparative box plot 310 also shows that a white point calibration using subtractive color measurements may yield even better results. In the comparative box plot 310, a white point distribution 324 denotes another range of initial white point values for a sample of displays 18. Despite this wider range of white points, after a white point calibration using subtractive color values, the same sample of displays 18 has a calibrated white point distribution 326. The calibrated white point distribution 326 is even closer to the nominal target white point Y value 314 (0.326), having an average X value of 0.326, but with a much smaller standard deviation of 0.0003.

Technical effects of this disclosure include a more effective manner of calibrating the white point of an electronic display. Indeed, even when the electronic display exhibits crosstalk characteristics, the use of subtractive color measurements may substantially improve the resulting white point behavior after white point calibration. Moreover, measuring subtractive color rather than merely additive color may be effective regardless of the degree to which the electronic display exhibits crosstalk between color channels (e.g., LTPS displays vs. a-Si displays). It may also be noted that, because the use of subtractive color measurements may result in tighter tolerances, using subtractive color measurements with an iterative color white point calibration may result in faster convergence to an acceptable white point within a particular white point specification range. This may save valuable time and may result in more displays that become acceptably calibrated within a maximum period of time allotted to calibrate a display.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. For example, although some of the particular examples discussed above relate to displays with red, green, and blue color channels, subtractive color measurements may benefit displays with any other suitable color channels. Moreover, while this disclosure has described white point calibration of a liquid crystal display, essentially any other form of display (e.g., organic light emitting diode (OLED) display, plasma display, cathode ray tube (CRT) display) may benefit from white point calibration according to this disclosure, particularly if such displays exhibit crosstalk between color channels.

What is claimed is:

1. A method for calibrating an electronic display comprising:
   measuring a first optical response of an electronic display, wherein the first response occurs when the electronic display is programmed to display a first mixed color due to image data supplied to a first color subpixel and a second color subpixel but not a third color subpixel;
   measuring a second optical response of the electronic display, wherein the second response occurs when the electronic display is programmed to display a second mixed color due to image data supplied to the first color subpixel and the third color subpixel but not the second color subpixel;
   measuring a third optical response of the electronic display, wherein the third response occurs when the electronic display is programmed to display a third mixed color due to image data supplied to the second color subpixel and the third color subpixel but not a first color subpixel; and
   calibrating a white point of the electronic display based at least in part on the first, second, and third optical responses.

2. The method of claim 1, wherein:
   the first color subpixel comprises a blue color subpixel;
   the second color subpixel comprises a green color subpixel;
   the third color subpixel comprises a red color subpixel;
   the first mixed color comprises cyan;
   the first mixed color comprises magenta; and
   the first mixed color comprises yellow.

3. The method of claim 1, wherein the white point is calibrated based at least in part on a 3×3 XYZ transformation matrix linking XYZ tristimulus values to a color space associated with the first color subpixel, the second color subpixel, and the third color subpixel.

4. The method of claim 3, wherein the white point is calibrated based at least in part on the 3×3 XYZ transformation matrix, wherein the each of the components of the 3×3 XYZ transformation matrix are determined based on coupled values of the colors of the color space, wherein each of the coupled values of the colors of the color space are determined by subtracting one of the three optical responses from a sum of the remaining two responses.

5. The method of claim 1, wherein the white point is calibrated without considering any other optical responses of the electronic display occurring when the electronic display is programmed to display any color due to image data supplied only to a single one of the first, second, or third color subpixel.

6. A system for calibrating a white point of an electronic display, comprising:
   one or more light sensors configured to detect light emitted by the electronic display; and
   a calibration test controller configured to cause the electronic display to display a series of subtractive colors and program white point calibration parameters of the electronic display based at least in part on the resulting light detected by the one or more light sensors while the electronic display is displaying the series of subtractive colors;
   wherein the calibration test controller is configured to program the white point calibration parameters based at least in part on the resulting light detected by the one or more light sensors while the electronic display is displaying the series of subtractive colors when the electronic display comprises driving circuitry formed using low temperature polysilicon (LTPS) and when the electronic display comprises driving circuitry formed using amorphous silicon (a-Si).

7. The system of claim 6, wherein the calibration test controller is configured to cause the electronic display to display the series of subtractive colors, wherein the series of subtractive colors comprises cyan, magenta, and yellow.

8. The system of claim 6, wherein the calibration test controller is configured to cause the electronic display not to display any single additive colors.

9. The system of claim 6, wherein the calibration test controller is configured to isolate additive colors from the resulting light detected by the one or more light sensors while the electronic display is displaying the series of subtractive colors and to program the white point calibration parameters based at least in part on the isolated additive colors.

10. A method for manufacturing an electronic device, comprising:
    providing an enclosure;
    providing an electronic display having red, green, and blue subpixels, wherein a white point of the electronic display has been calibrated by:
    measuring a first optical response of the electronic display when the electronic display is programmed to display cyan using only the green and blue subpixels;
    measuring a second optical response of the electronic display when the electronic display is programmed to display magenta using only the blue and red subpixels;
    measuring a third optical response of the electronic display when the electronic display is programmed to display yellow using only the red and green subpixels; and
    calibrating the white point of the electronic display based at least in part on the first, second, and third optical responses; and
    installing the electronic display into the enclosure.

11. The method of claim 10, wherein the electronic display that is provided exhibits crosstalk between the red, green, and blue subpixels.

12. The method of claim 10, wherein the electronic display that is provided uses a demultiplexer to demultiplex image data signals provided to the red, green, and blue subpixels, wherein the demultiplexer does not completely separate the image data signals provided to the red, green, and blue subpixels.

13. The method of claim 10, wherein the white point has been calibrated using only the first, second, and third optical responses.

14. An electronic display comprising:
    a display panel comprising a plurality of subpixels of different colors; and
    display driver circuitry configured to provide image data signals to the display panel, wherein the display driver circuitry comprises white point calibration parameters configured to cause the display driver circuitry to provide the image data signals to substantially achieve a desired white point on the display panel, wherein the white point calibration parameters are based on a transformation matrix relating the different colors of the plurality of subpixels to a color space, wherein coefficients of the transformation matrix are based exclusively on subtractive color measurements of the plurality of subpixels of the different colors;
    wherein:
    the color space comprises an XYZ color space; and
    each coefficient of the transformation matrix comprises a value relating one of the components of the XYZ color space to a particular one of the different colors of the plurality of subpixels via a subtraction of one subtractive color measurement from other subtractive color measurements.

15. The electronic display of claim 14, wherein:
the different colors of the plurality of subpixels consist of red, green, and blue;
the transformation matrix comprises a 3×3 transformation matrix; and
each coefficient of the transformation matrix comprises a value that relates one of the components of the XYZ color space to a particular one of the different colors of the plurality of subpixels while taking into account crosstalk from image data provided to the other of the different colors.

16. The electronic display of claim 14, wherein:
the different colors of the plurality of subpixels consist of red, green, and blue;
the transformation matrix comprises a 3×3 transformation matrix; and
the transformation matrix is configured to relate the different colors of the plurality of subpixels (RGB) to the color space (XYZ) according to the following relationship:

$$\begin{bmatrix} X \\ Y \\ Z \end{bmatrix} = \begin{bmatrix} X_{r'} & X_{g'} & X_{b'} \\ Y_{r'} & Y_{g'} & Y_{b'} \\ Z_{r'} & Z_{g'} & Z_{b'} \end{bmatrix} \begin{bmatrix} R \\ G \\ B \end{bmatrix};$$

where each coefficient ($X_{r'}$, $X_{g'}$, $X_{b'}$, $Y_{r'}$, $Y_{g'}$, $Y_{b'}$, $Z_{r'}$, $Z_{g'}$, $Z_{b'}$) is based on three subtractive color measurements.

17. The electronic display of claim 14, wherein:
the different colors of the plurality of subpixels consist of red, green, and blue;
the transformation matrix comprises a 3×3 transformation matrix; and
the transformation matrix is configured to relate the different colors of the plurality of subpixels (RGB) to the color space (XYZ) according to the following relationship:

$$\begin{bmatrix} X \\ Y \\ Z \end{bmatrix} = \begin{bmatrix} X_{r'} & X_{g'} & X_{b'} \\ Y_{r'} & Y_{g'} & Y_{b'} \\ Z_{r'} & Z_{g'} & Z_{b'} \end{bmatrix} \begin{bmatrix} R \\ G \\ B \end{bmatrix};$$

where each coefficient ($X_{r'}$, $X_{g'}$, $X_{b'}$, $Y_{r'}$, $Y_{g'}$, $Y_{b'}$, $Z_{r'}$, $Z_{g'}$, $Z_{b'}$) is based on coupled measurements of red, green, and blue.

18. The electronic device of claim 14, wherein
the different colors of the plurality of subpixels consist of red, green, and blue; and
the transformation matrix is configured to relate the different colors of the plurality of subpixels (RGB) to the color space (XYZ) according to the following relationships:

$$\begin{bmatrix} X \\ Y \\ Z \end{bmatrix} = \begin{bmatrix} X_{r'} & X_{g'} & X_{b'} \\ Y_{r'} & Y_{g'} & Y_{b'} \\ Z_{r'} & Z_{g'} & Z_{b'} \end{bmatrix} \begin{bmatrix} R \\ G \\ B \end{bmatrix};$$

and $$\begin{bmatrix} X_{r'} & X_{g'} & X_{b'} \\ Y_{r'} & Y_{g'} & Y_{b'} \\ Z_{r'} & Z_{g'} & Z_{b'} \end{bmatrix} = \begin{bmatrix} X_y + X_m - X_c & X_y - X_m + X_c & X_m - X_y + X_c \\ Y_y + Y_m - Y_c & Y_y - Y_m + Y_c & Y_m - Y_y + Y_c \\ Z_y + Z_m - Z_c & Z_y - Z_m + Z_c & Z_m - Z_y + Z_c \end{bmatrix};$$

where:
the coefficient $X_y$ represents the X component of the XYZ color space occurring while the electronic display is displaying a yellow color due to image data supplied to the red and green subpixels;
the coefficient $Y_y$ represents the Y component of the XYZ color space occurring while the electronic display is displaying the yellow color due to image data supplied to the red and green subpixels;
the coefficient $Z_y$ represents the Z component of the XYZ color space occurring while the electronic display is displaying the yellow color due to image data supplied to the red and green subpixels;
the coefficient $X_m$ represents the X component of the XYZ color space occurring while the electronic display is displaying a magenta color due to image data supplied to the blue and red subpixels;
the coefficient $Y_m$ represents the Y component of the XYZ color space occurring while the electronic display is displaying the magenta color due to image data supplied to the blue and red subpixels;
the coefficient $Z_m$ represents the Z component of the XYZ color space occurring while the electronic display is displaying the magenta color due to image data supplied to the blue and red subpixels;
the coefficient $X_c$ represents the X component of the XYZ color space occurring while the electronic display is displaying a cyan color due to image data supplied to the blue and green subpixels;
the coefficient $Y_c$ represents the Y component of the XYZ color space occurring while the electronic display is displaying the cyan color due to image data supplied to the blue and green subpixels; and
the coefficient $Z_c$ represents the Z component of the XYZ color space occurring while the electronic display is displaying the cyan color due to image data supplied to the blue and green subpixels.

* * * * *